(12) United States Patent
Jeong et al.

(10) Patent No.: US 11,333,898 B2
(45) Date of Patent: May 17, 2022

(54) CAMERA MODULE

(71) Applicant: Samsung Electro-Mechanics Co., Ltd., Suwon-si (KR)

(72) Inventors: Bong Won Jeong, Suwon-si (KR); Nam Ki Park, Suwon-si (KR); Hong Joo Lee, Suwon-si (KR); Young Bok Yoon, Suwon-si (KR); Jung Seok Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/085,008

(22) Filed: Oct. 30, 2020

(65) Prior Publication Data
US 2021/0333567 A1  Oct. 28, 2021

(30) Foreign Application Priority Data

Apr. 23, 2020 (KR) .................. 10-2020-0049021

(51) Int. Cl.
*G02B 27/64* (2006.01)
*H04N 5/232* (2006.01)
(Continued)

(52) U.S. Cl.
CPC ............. *G02B 27/646* (2013.01); *G03B 5/02* (2013.01); *H04N 5/23248* (2013.01); *G03B 17/12* (2013.01)

(58) Field of Classification Search
CPC ........ G02B 27/646; G03B 5/02; G03B 17/12; H04N 5/23248
See application file for complete search history.

(56) References Cited

U.S. PATENT DOCUMENTS

2006/0269263 A1  11/2006  Kim et al.
2014/0355120 A1*  12/2014  Yeo .................. G03B 5/00
                                             359/557
(Continued)

FOREIGN PATENT DOCUMENTS

KR  10-2006-0124418 A  12/2006
KR  10-1389375 B1  4/2014
(Continued)

OTHER PUBLICATIONS

Korean Office Action dated May 17, 2021 in counterpart Korean Patent Application No. 10-2020-0049021 (6 pages in English)(5 pages in Korean).

*Primary Examiner* — Clayton E. LaBalle
*Assistant Examiner* — Diana Hancock
(74) *Attorney, Agent, or Firm* — NSIP Law

(57) ABSTRACT

A camera module device is provided. The device includes a movable body configured to accommodate a lens barrel and configured to be moved in a direction of an optical axis and in a direction perpendicular to the optical axis, a housing configured to accommodate the movable body, a first driving unit, disposed on a first surface of the movable body, and configured to generate a first driving force to move the movable body in the direction of the optical axis, a second driving unit, disposed on a second surface and a third surface of the movable body, and configured to generate driving force to move the movable body in a direction perpendicular to the optical axis, and a first sensing unit, disposed on a fourth surface of the movable body, and configured to detect a position of the lens barrel moved in a direction perpendicular to the optical axis.

15 Claims, 17 Drawing Sheets

(51) Int. Cl.
  *G03B 5/02*   (2021.01)
  *G03B 17/12*  (2021.01)

(56) References Cited

U.S. PATENT DOCUMENTS

| | | | |
|---|---|---|---|
| 2014/0362284 A1* | 12/2014 | Shin | H04N 5/2254 |
| | | | 348/373 |
| 2015/0346453 A1* | 12/2015 | Cheong | H04N 5/2257 |
| | | | 359/824 |
| 2016/0269644 A1* | 9/2016 | Cheong | G02B 7/08 |
| 2018/0149881 A1* | 5/2018 | Kim | G02B 7/08 |
| 2019/0162930 A1* | 5/2019 | Min | G02B 7/102 |
| 2020/0036301 A1* | 1/2020 | Wu | G02B 7/09 |
| 2020/0174272 A1* | 6/2020 | Minamisawa | G03B 5/04 |

FOREIGN PATENT DOCUMENTS

| KR | 10-2014-0144126 A | 12/2014 |
|---|---|---|
| KR | 10-2019-0002149 A | 1/2019 |
| KR | 10-2019-0031804 A | 3/2019 |

\* cited by examiner

CAMERA MODULE

CROSS-REFERENCE TO RELATED APPLICATION(S)

This application claims the benefit under 35 USC 119(a) of Korean Patent Application No. 10-2020-0049021 filed on Apr. 23, 2020 in the Korean Intellectual Property Office, the entire disclosure of which is incorporated herein by reference for all purposes.

BACKGROUND

1. Field

The following description relates to a camera module.

2. Description of Related Art

Camera modules may include lens modules. The lens module may be moved in an optical axis direction and in a direction perpendicular to the optical axis to enable focus adjustment and camera shake correction of the camera module. The camera module may include a plurality of driving units that enable movement of the lens module. The driving units include a coil and a magnet. The camera module may include a detection sensor that detects the position of the lens module. The detection sensor is configured to detect the position of the lens module through a change in the magnetic field according to the movement of the lens module. However, as described above, a plurality of driving units with magnets are disposed around the lens module, so that the detection reliability of the lens module by the detection sensor may be poor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module device includes a movable body configured to accommodate a lens barrel and configured to be moved in a direction of an optical axis and in a direction perpendicular to the optical axis; a housing configured to accommodate the movable body; a first driving unit, disposed on a first surface of the movable body, and configured to generate a first driving force to move the movable body in the direction of the optical axis; a second driving unit, disposed on a second surface and a third surface of the movable body, and configured to generate a second driving force to move the movable body in the direction perpendicular to the optical axis; and a first sensing unit, disposed on a fourth surface of the movable body, and configured to detect a position of the lens barrel when the lens barrel is moved in the direction perpendicular to the optical axis.

The movable body may include a first frame, configured to move in the direction of the optical axis; a second frame, disposed on the first frame, and configured to move in a first direction, perpendicular to the optical axis; and a third frame, disposed on the second frame, and configured to move in a second direction, perpendicular to the optical axis and the first direction.

The device may further include a cover member combined with the first frame when the second frame and the third frame are mounted to prevent the second frame and the third frame from deviating from the first frame.

The device may include ball bearings disposed between the first frame and the second frame, and between the second frame and the third frame.

A first driving magnet of the first driving unit may be disposed on a first surface of the first frame, and a second driving magnet of the second driving unit may be disposed on different second and third surfaces of the third frame, not facing the first surface.

A first sensing magnet of the first sensing unit may be disposed on a fourth surface of the third frame, not facing the first surface.

The first sensing unit may include a first sensing magnet disposed on the movable body; and a first detection sensor disposed on the housing.

The first detection sensor may be disposed at an interval in a direction perpendicular to the optical axis.

The first detection sensor may be disposed at an interval in the direction of the optical axis.

The first sensing magnet may be configured to have a first polarity and a second polarity formed in a direction perpendicular to the optical axis.

The first sensing magnet may be configured to have a neutral region disposed between the first polarity and the second polarity.

The first sensing magnet may be provided at an interval in a direction perpendicular to the optical axis.

In a general aspect, an electronic device includes a housing; and a camera module disposed in the housing, wherein the camera module comprises a moveable body, configured to accommodate a lens barrel, the movable body comprising a first frame, disposed in the housing, and configured to move the lens barrel in an optical axis direction; a second frame, disposed on the first frame, and configured to move the lens barrel in a first direction, perpendicular to the optical axis direction; a third frame, disposed on the second frame, and configured to move the lens barrel in a second direction perpendicular to the optical axis direction, and a first sensing unit, disposed on a surface of the movable body, and configured to detect a moving position of the movable body in the direction perpendicular to the optical axis direction.

The device may include a first driving unit, disposed on a first surface of the moveable body, and configured to move the first frame in the optical axis direction, and a second driving unit, disposed on a second surface and a third surface of the moveable body, and configured to move the second frame and the third frame in the direction perpendicular to the optical axis direction.

The first sensing unit is disposed on a fourth surface of the movable body, and is configured to detect a position of the lens barrel when the lens barrel is moved in the direction perpendicular to the optical axis.

The device may further include a second sensing unit configured to detect a moving position of the movable body in the optical axis direction.

Other features and aspects will be apparent from the following detailed description, the drawings, and the claims.

Figure 1:
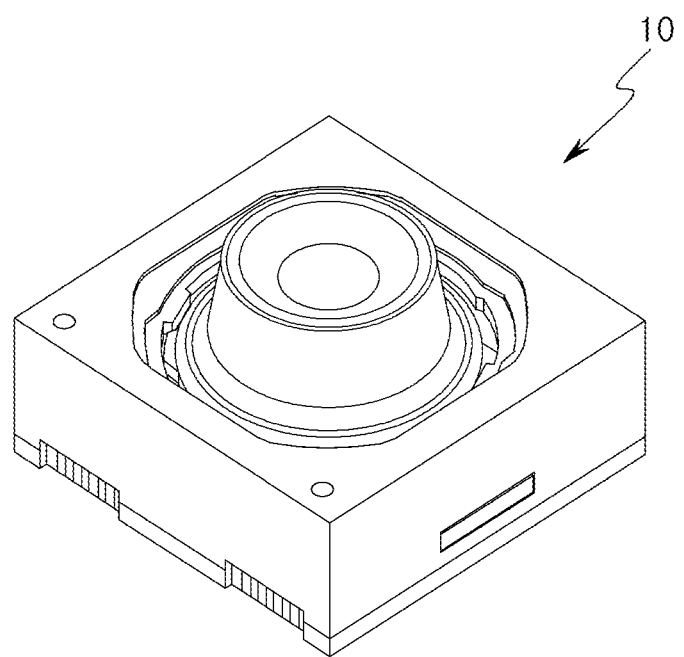
FIG. 1 is a perspective view of an example camera module, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

A configuration of a camera module, in accordance with one or more embodiments, will be described with reference to FIGS. 1 and 2.

A camera module 10, in accordance with one or more embodiments, may be mounted in a portable electronic product. In an example, the camera module 10 may be mounted on, as non-limiting examples, a mobile phone, laptop, or the like. However, the use range of the camera module 10, in accordance with one or more embodiments, is not limited to the aforementioned electronic products. In an example, the camera module 10 may be mounted in an automated teller machine (ATM), a television for interactive broadcasting, and the like.

Figure 2:
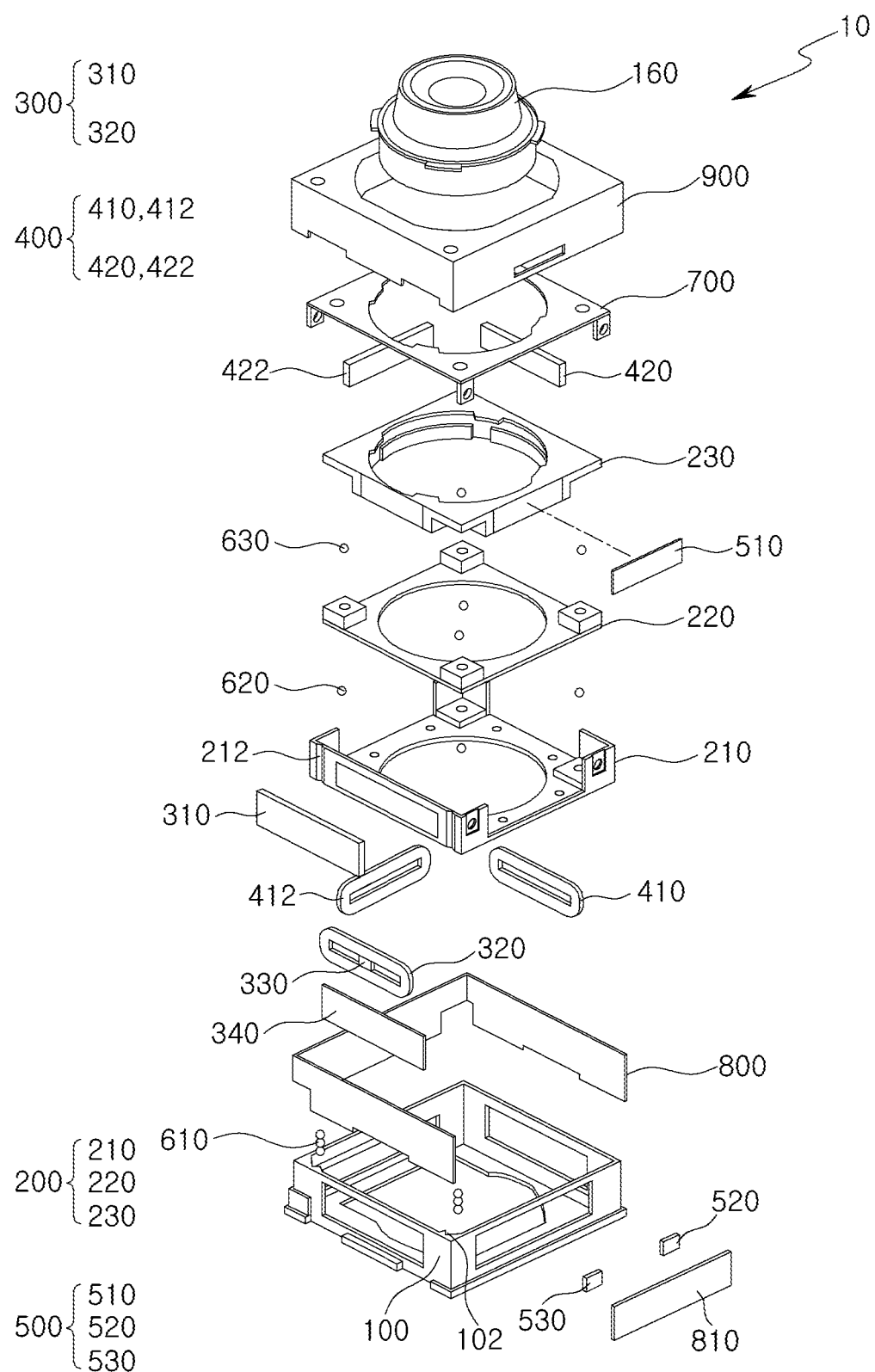
FIG. 2 is an exploded perspective view of the example camera module illustrated in FIG. 1.

As illustrated in FIG. 2, the camera module 10 may include a housing 100, a lens barrel 160, a movable body 200 (210, 220, 230), a first driving unit 300 (310, 320), a second driving unit 400 (410, 412, 420, 422), and a first sensing unit 500 (510, 520, 530). However, the configuration of the camera module 10 is not limited to the aforementioned members. For example, the camera module 10 may further include a ball bearing 600 (610, 620 and 630), a cover member 700, a substrate 800, and a shield can 900.

The housing 100 may be formed in the form of a face body with open upper and lower surfaces. In an example, the housing 100 may be configured in a substantially hexahedral shape. Four sides of the housing 100 may be partially cutaway. The driving force of the first driving unit 300 and the second driving unit 400 may be transmitted to the movable body 200 through the cut side. A pair of first guide grooves 102 may be formed in an inner side of the housing 100. The first guide groove 102 may be formed to be elongated in the height direction of the housing 100. One or more first ball bearings 610 may be disposed in the first guide groove 102.

The movable body 200 is disposed inside the housing 100 and may be configured to move in the direction of an optical axis and in a direction perpendicular to the optical axis within the housing 100. The movable body 200 may be comprised of a plurality of members. For example, the movable body 200 may be comprised of a first frame 210, a second frame 220, and a third frame 230.

The first frame 210 may have a shape which is open in the vertical direction and which has one closed side and three open sides. A pair of second guide grooves 212 may be formed in one closed side. One or more first ball bearings 610 may be disposed in the second guide groove 212. The first frame 210 is disposed inside the housing 100. The first frame 210 may be configured to move in the optical axis direction with respect to the housing 100. For example, the first frame 210 may move in the optical axis direction by the first ball bearing 610 disposed in the guide grooves 102 and 212. The driving force necessary to drive the first frame 210 may be provided by the first driving unit 300.

The second frame 220 may have a substantially thin plate shape in which upper and lower portions in the vertical direction are open. The second frame 220 may be configured to be disposed on the first frame 210, and to move in a first direction, perpendicular to the optical axis. In an example, the second frame 220 may move in the first direction, perpendicular to the optical axis, by second ball bearing 620 disposed between the first frame 210 and the second frame 220. The driving force necessary to drive the second frame 220 may be provided by the second driving unit 400.

The third frame 230 may have a shape, of which upper and lower portions in the vertical direction are open and which has a predetermined height. The third frame 230 may be configured to be disposed on the second frame 220 and to move in a second direction, perpendicular to the optical axis. In an example, the third frame 230 may move in the second direction, perpendicular to the optical axis, by third ball bearing 630 disposed between the second frame 220 and the third frame 230. The driving force required for driving the third frame 230 may be provided by the second driving unit 400.

The lens barrel 160 may be combined with the third frame 230. The lens barrel 160 may be moved by the movable body 200 in an optical axis direction and a direction, perpendicular to the optical axis. For example, the lens barrel 160 may move in the optical axis direction based on a movement by the first frame 210. In another example, the lens barrel 160 may move in a direction, perpendicular to the optical axis, based on movements by the second frame 220 and the third frame 230. The movement of the lens barrel 160 in the direction of the optical axis may enable focus adjustment of the camera module 10, and the movement of the lens barrel 160 in a direction, perpendicular to the optical axis may enable camera shake correction function of the camera module 10.

The first driving unit 300 may be configured to move the movable body 200 in the optical axis direction. For example, the first driving unit 300 may provide driving force required to move the first frame 210 in the optical axis direction. The first driving unit 300 may include a first driving magnet 310 and a first driving coil 320. The first driving unit 300 may be configured to generate a driving force to move the movable body 200 in the optical axis direction, on a first surface of the movable body 200. In an example, the first driving magnet 310 may be disposed on a first surface of the first frame 210, and the first driving coil 320 may be disposed on a first surface of the housing 100.

The camera module 10 may include a second sensing unit to detect the moving position of the movable body 200 in the optical axis direction. In an example, the camera module 10 may include a hall sensor 330. In a non-limiting example, the hall sensor 330 may be disposed in the center of the winding of the first driving coil 320.

The second driving unit 400 may be configured to move the movable body 200 in a direction, perpendicular to the optical axis. For example, the second driving unit 400 may provide a driving force that is necessary for the movement of the second frame 220 and the third frame 230. The second driving unit 400 may include second driving coils 410 and 412 and second driving magnets 420 and 422. The second driving unit 400 may be configured to generate a driving force to move the movable body 200 in a direction, perpendicular to the optical axis, on the second and third surfaces of the movable body 200. For example, the second driving magnets 420 and 422 may be disposed on the second and third surfaces of the third frame 230, respectively, and the second driving coils 410 and 412 may be disposed on the second and third surfaces of the housing 100, respectively. In an example, the second surface of the third frame 230 may be a surface intersecting the first surface of the first frame 210, and the third surface of the third frame 230 may be a surface intersecting the second surface of the third frame 230 while not intersecting the first surface of the first frame 210.

The first sensing unit 500 may be configured to detect a moving position of the movable body 200 in a direction, perpendicular to the optical axis. In an example, the first sensing unit 500 may be configured to detect the moving position of the third frame 230. The first sensing unit 500 may include a first sensing magnet 510 and first detection sensors 520 and 530. The first sensing unit 500 may be configured to sense the displacement of the movable body 200 moving in a direction, perpendicular to the optical axis, on the fourth surface of the movable body 200. For example, the first sensing magnet 510 may be disposed in the center of the fourth surface of the third frame 230, and the first detection sensors 520 and 530 may be disposed on the fourth surface of the housing 100. The first detection sensors 520 and 530 may be disposed at an interval therebetween in a direction, perpendicular to the optical axis. For example, the first detection sensor 520 may be disposed to face one end of the first sensing magnet 510, and the first detection sensor 530 may be disposed to face the other end of the first sensing magnet 510.

The camera module 10 may include a unit that binds the first frame 210 to the third frame 230. For example, the camera module 10 may include a cover member 700 for binding the second frame 220 and the third frame 230 to the first frame 210. The cover member 700 is coupled to the first frame 210 in a state in which the first frame 210 to the third frame 230 are stacked, to prevent the separation of the second frame 220 and the third frame 230 from the first frame 210.

The camera module 10 may include a unit that supplies current to the driving units 300 and 400. In an example, the camera module 10 may include a first substrate 800. The first substrate 800 may be configured to supply current necessary to drive the first driving unit 300 and the second driving unit 400. in an example, the first substrate 800 may supply current to the first driving coil 320 and the second driving coil 410 and 412. The first substrate 800 may be configured to provide a space in which the first driving coil 320 and the second driving coils 410 and 412 may be disposed. In an example, the first substrate 800 may be disposed to surround the first surface, the second surface and the third surface of the housing 100, to provide a space in which the first driving coil 320 and the second driving coils 410 and 412 may be disposed in the housing 100.

The camera module 10 may include a unit that electrically connects the first detection sensors 520 and 530. For example, the camera module 10 may include a second substrate 810. The second substrate 810 may be configured to transmit a detection signal received from the first detection sensors 520 and 530 to a control unit. For example, the second substrate 810 may be electrically connected to a main circuit board of the camera module 10 together with the first substrate 800. The second substrate 810 may be integrally formed with the first substrate 800. For example, one end of the first substrate 800 and one end of the second substrate 810 may be configured to be connected to each other. Additionally, the first substrate 800 and the second substrate 810 may be manufactured in the form of a flexible printed circuit board to facilitate thinning of the camera module 10.

The camera module 10 may include a unit for shielding electromagnetic waves. For example, the camera module 10 may include a shield can 900. The shield can 900 may be formed in a shape surrounding the housing 100, the movable body 200, and the cover member 700. Accordingly, intrusion or emission of harmful electromagnetic waves generated inside or outside the camera module 10 may be blocked by the shield can 900.

Figure 4:
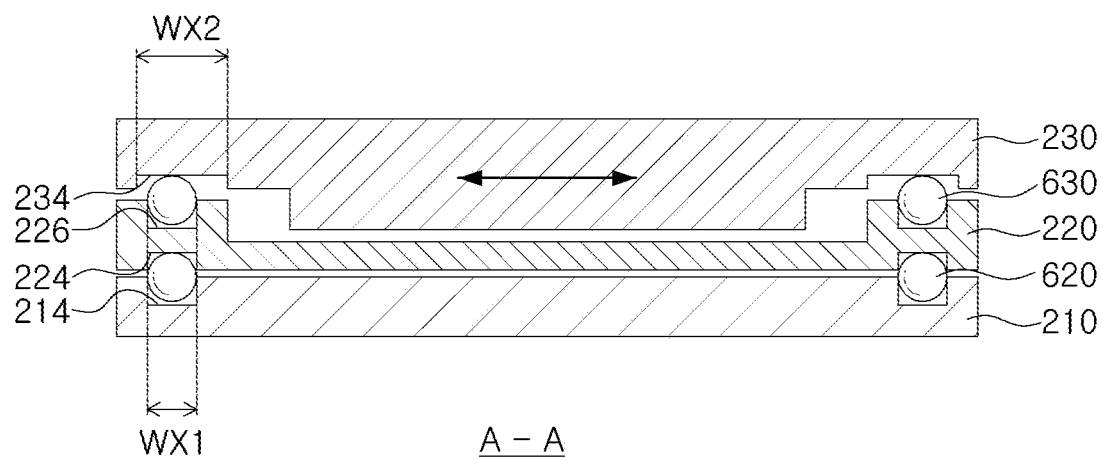
FIG. 4 is a cross-sectional view taken along line A-A in FIG. 3.
Figure 5:
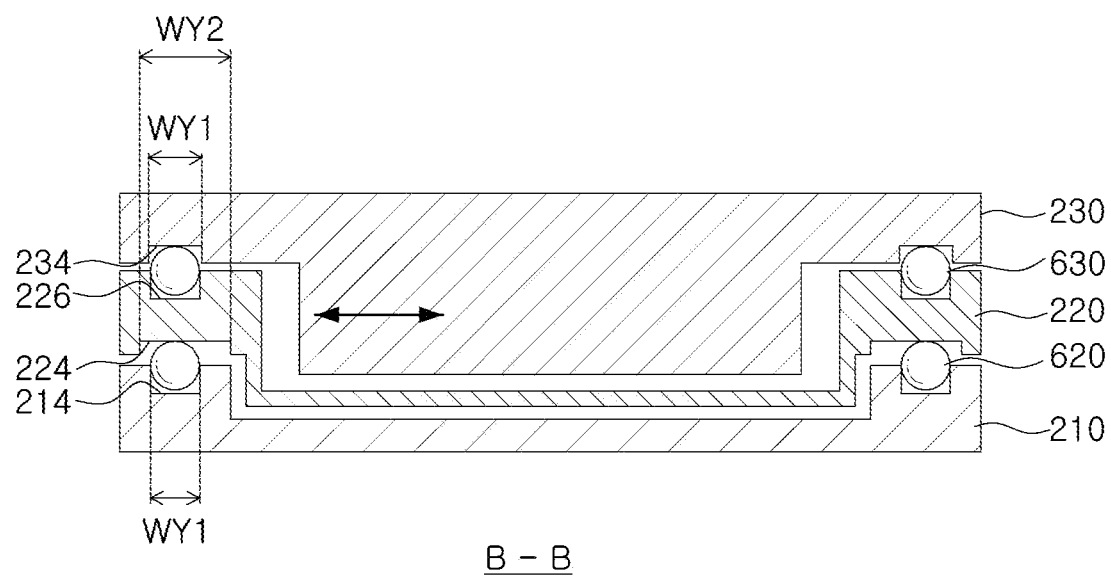
FIG. 5 is a cross-sectional view taken along line B-B in FIG. 3.

The moving structure of the movable body 200 will be described with reference to FIGS. 3 to 5.

Figure 3:
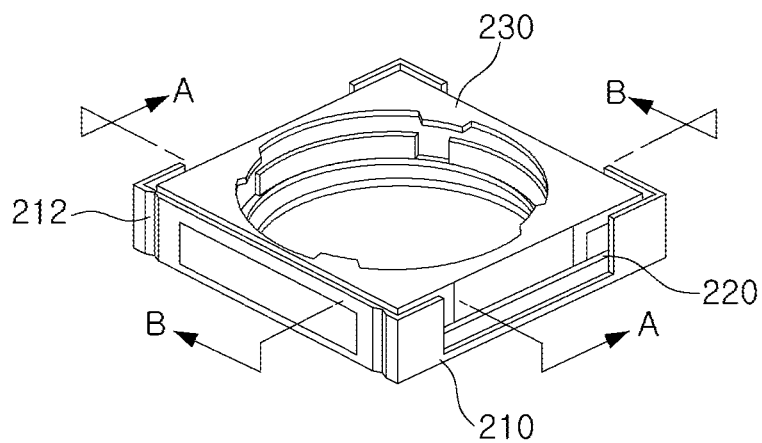
FIG. 3 is a combined perspective view of an example movable body illustrated in FIG. 2.

The first frame 210, the second frame 220 and the third frame 230 constituting the movable body 200 may be stacked and coupled in the optical axis direction as illustrated in FIG. 3. The first frame 210 may be configured to accommodate the second frame 220 and the third frame 230. In an example, the second frame 220 and the third frame 230 may be configured to move in a direction, perpendicular to the optical axis, while being accommodated inside the first frame 210.

The ball bearings 610 and 620 may be disposed between the first frame 210 and the third frame 230. In an example, the second ball bearing 620 may be disposed between the first frame 210 and the second frame 220, and the third ball bearing 630 may be disposed between the second frame 220 and the third frame 230.

A space for the ball bearing to be disposed may be formed in the first frame 210 to the third frame 230. For example, a first groove 214 is formed in the upper portion of the first frame 210, second grooves 224 and 226 are formed in the upper and lower portions of the second frame 220, and a third groove 234 may be formed in the lower portion of the third frame 230.

The lengths of the grooves 224 and 234 formed below the second frame 220 and the third frame 230 may be formed differently depending on the moving directions of the second frame 220 and the third frame 230. In an example, a length WY2 of the groove 224 in the first direction may be greater than a length WX1 in the second direction, and a length WX2 of the groove 234 in the second direction may be greater than a length WY1 of the groove 234 in the first direction. Additionally, a length WY2 of the groove 224 in the first direction may be greater than the length WY1 of the grooves 214, 226 and 234 in the first direction, and the length WX2 of the groove 234 in the second direction may be greater than the length WX1 of the grooves 214, 224 and 226 in the second direction.

In the example of the second frame 220 configured as described above, since the length of the groove 224 in the first direction may be greater than the length of the groove 214 in the first direction, relative movement thereof relative to the first frame 210 may be enabled. Additionally, in the example of the third frame 230, since the length of the groove 234 in the second direction may be greater than the length of the groove 226 of the second frame 220 in the second direction, relative movement of the third frame 230 relative to the second frame 220 may be enabled.

The arrangement form of the first sensing unit will be described with reference to FIG. 6.

Figure 6:
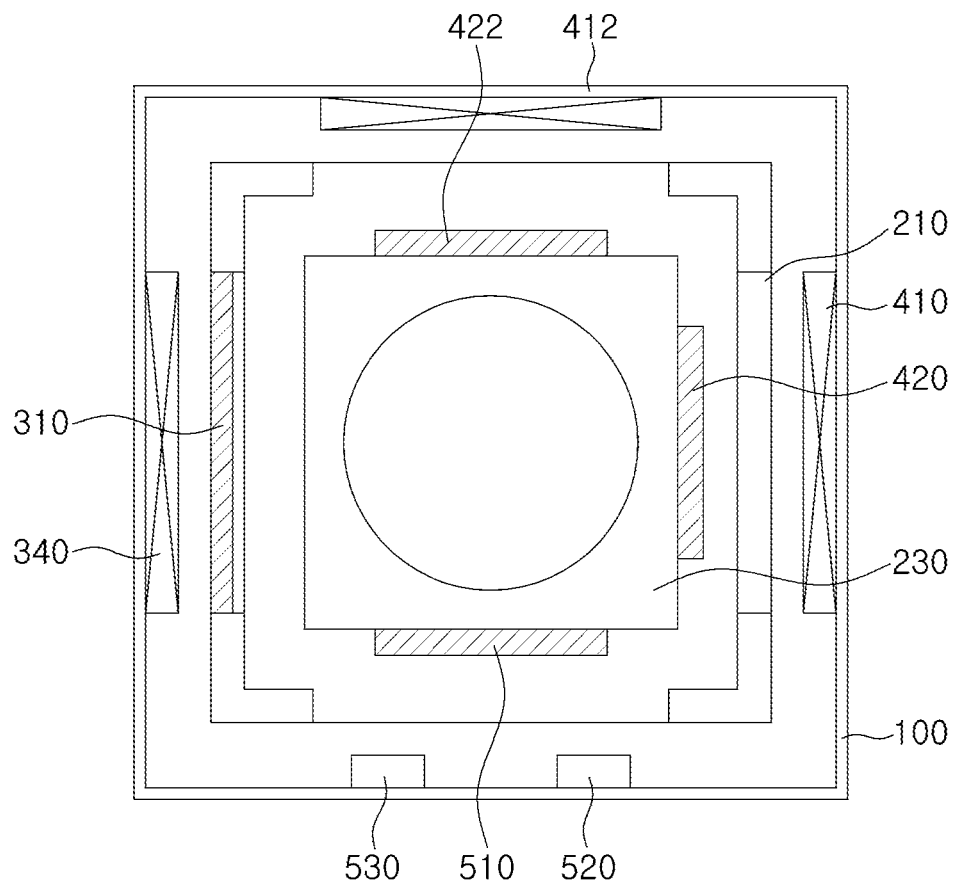
FIG. 6 is a plan view illustrating a coupling state of the example movable body and a housing illustrated in FIG. 3.
Figure 7A:
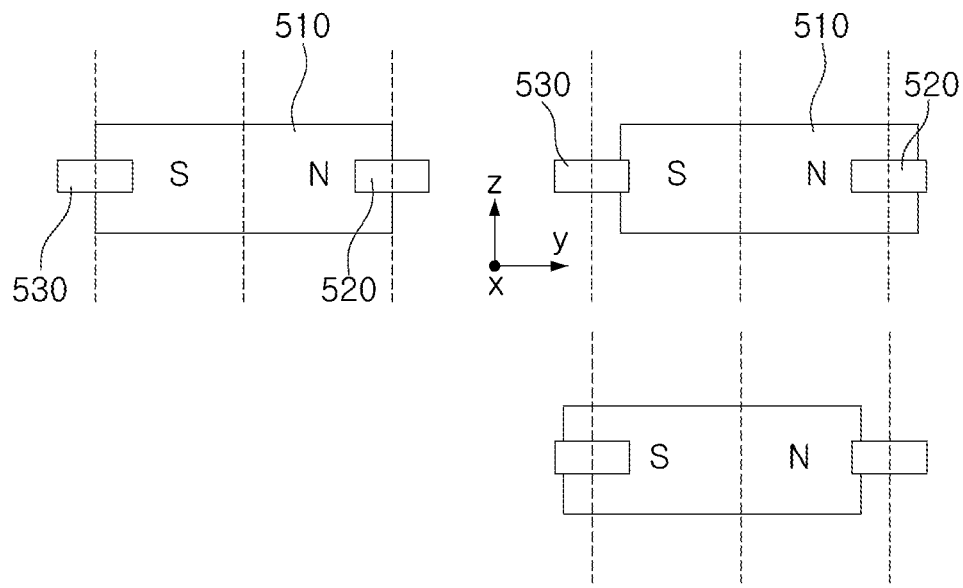
FIGS. 7A and 7B illustrate a side view and a plan view of an arrangement form of an example sensing unit illustrated in FIG. 6.
Figure 7B:
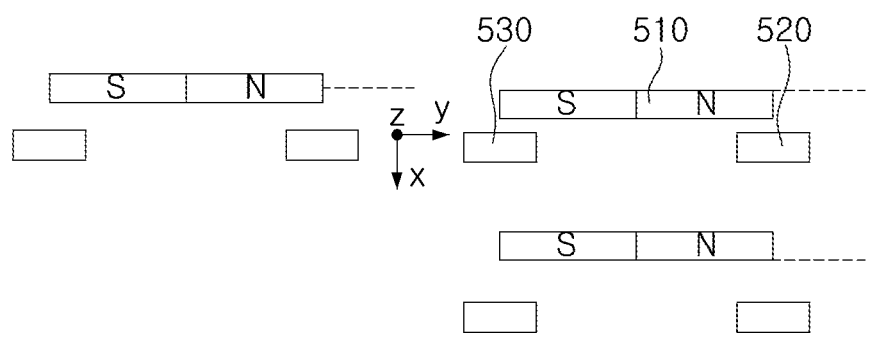

The first sensing unit 500 may be disposed on a portion that does not overlap with the first driving unit 300 and the second driving unit 400 as illustrated in FIG. 6. For example, the first driving unit 300 may be disposed on the first surfaces of the housing 100 and the first frame 210, the second driving unit 400 may be disposed on the second surface and the third surface of the housing 100 and the third frame 230, and the first sensing unit 500 may be disposed on the fourth surface of the housing 100 and the third frame 230.

The first sensing unit 500 may include a first sensing magnet 510 and first detection sensors 520 and 530. The first sensing magnet 510 may be disposed on one surface of the third frame 230 to significantly reduce the influence of the driving magnets 310, 420 and 422, as illustrated in FIG. 6. The first detection sensors 520 and 530 may be disposed on one surface of the housing 100 to significantly reduce the influence of the driving magnets 310, 420 and 422 while sensing the magnetic field of the first sensing magnet 510.

The first sensing unit 500 configured as described above may detect a position of the third frame 230 through the magnetic field of the first sensing magnet 510, in a state in which the first sensing unit 500 is hardly affected by the magnetic field generated from the driving units 300 and 400. Therefore, according to this example, not only image stabilization through the first sensing unit 500 may be quickly performed, but also the reliability of the image stabilization may be improved.

Next, a method of detecting the position of the third frame 230 through the first sensing unit 500 will be described with reference to FIGS. 7A to 9B.

The first sensing unit 500 may detect the position of the third frame 230 moving in the direction, perpendicular to the optical axis, through the first sensing magnet 510 and the first detection sensors 520 and 530. As an example, the first sensing unit 500 may calculate a movement amount y and a movement amount x of the third frame 230 in the first direction (the Y-axis direction based on FIGS. 7A and 7B) and the second direction (the X-axis direction based on FIGS. 7A and 7B), through a change h1 in magnetic field obtained from the first detection sensor 520 and a change h2 in magnetic field obtained from the first detection sensor 530. The calculation formula for calculating the movement amount y and the movement amount x is as follows.

$$y=(h2-h1)/(h1+h2)$$

$$x=h1+h2$$

Figure 8A:
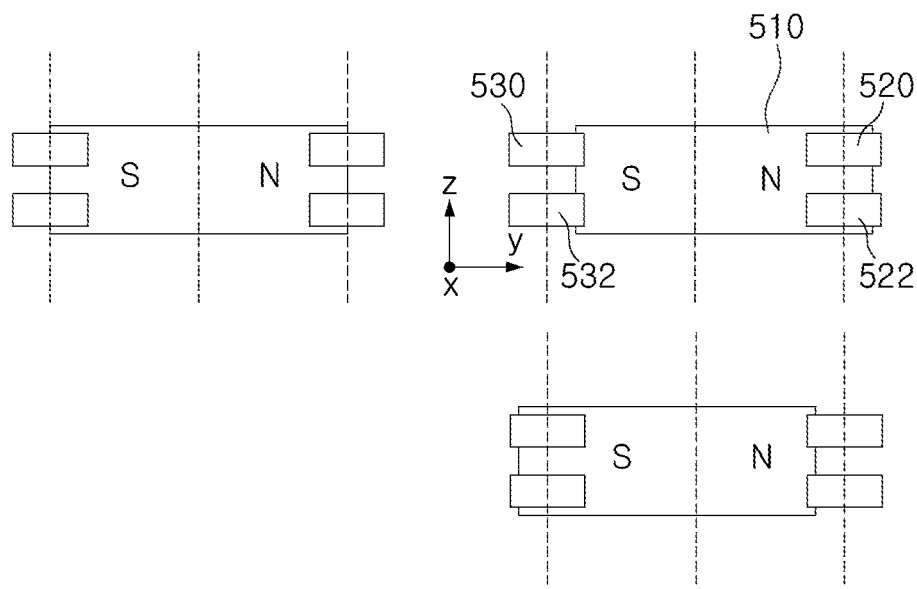
FIGS. 8A and 8B illustrate a side view and a plan view of an arrangement of an example sensing unit, in accordance with one or more embodiments.
Figure 8B:
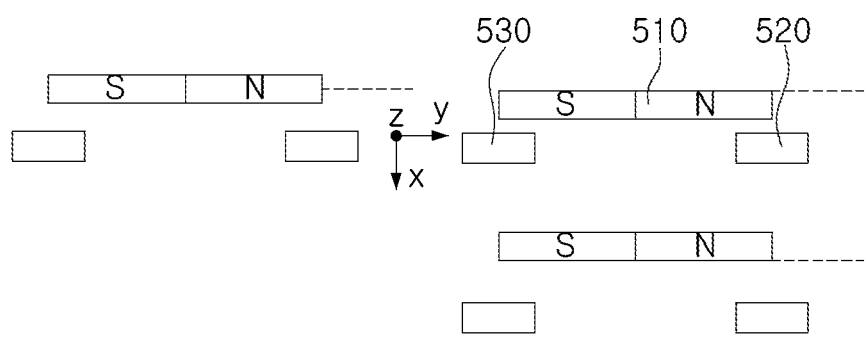

The first sensing unit 500 may include a plurality of first detection sensors 520 and 530 as illustrated in FIGS. 8A and 8B. In an example, the first detection sensors 520, 522, 530 and 532 may be disposed at an interval therebetween along the optical axis and in the optical axis direction. In this example, the movement amount of the third frame 230 may be calculated through the following calculation formula. For reference, h3 is a magnetic field change amount acquired from the first detection sensor 522, and h4 is a magnetic field change amount acquired from the first detection sensor 532.

$$y=h2-h1$$

$$x=h3+h4$$

Figure 9A:
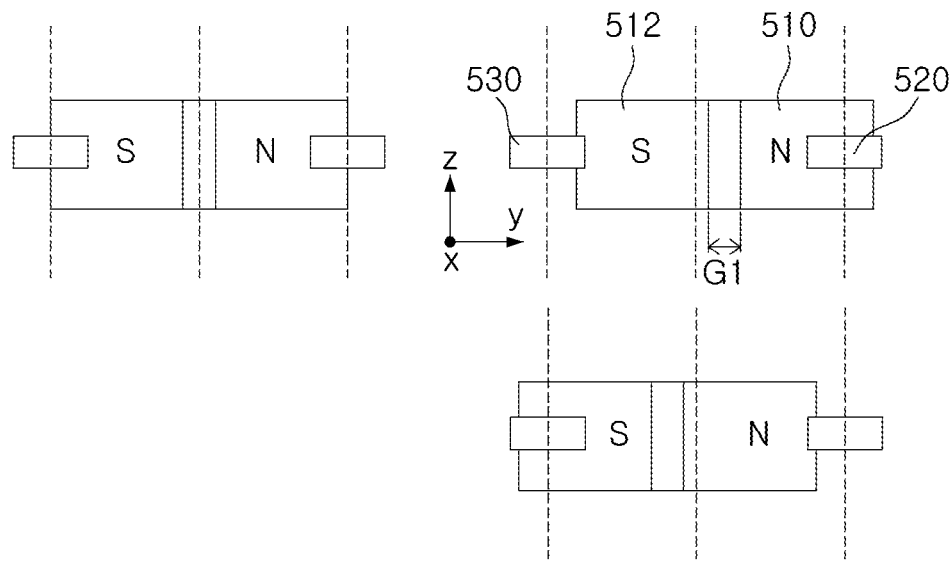
FIGS. 9A and 9B illustrate a side view and a plan view of an arrangement of an example sensing unit, in accordance with one or more embodiments.
Figure 9B:
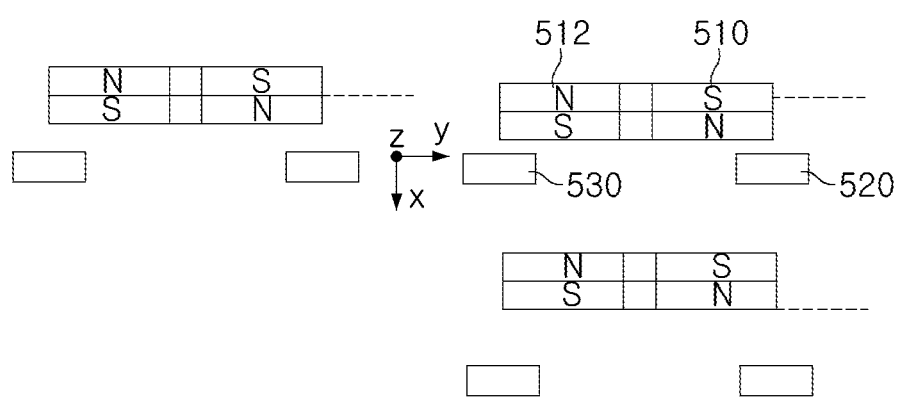

As illustrated in FIGS. 9A and 9B, the first sensing unit 500 may include a plurality of first sensing magnets 510 and 512. In an example, the first sensing magnets 510 and 512 may be disposed at an interval G1 therebetween in a direction, perpendicular to the optical axis. However, the first sensing magnets 510 and 512 are not configured to be separated. For example, the first sensing magnets 510 and 512 may be integrally formed (in this form, G1 may be a neutral region). In this form, the movement amount of the third frame 230 may be calculated through the following calculation formula.

$$y=h1+h2$$

$$x=h2-h1$$

Figure 10:
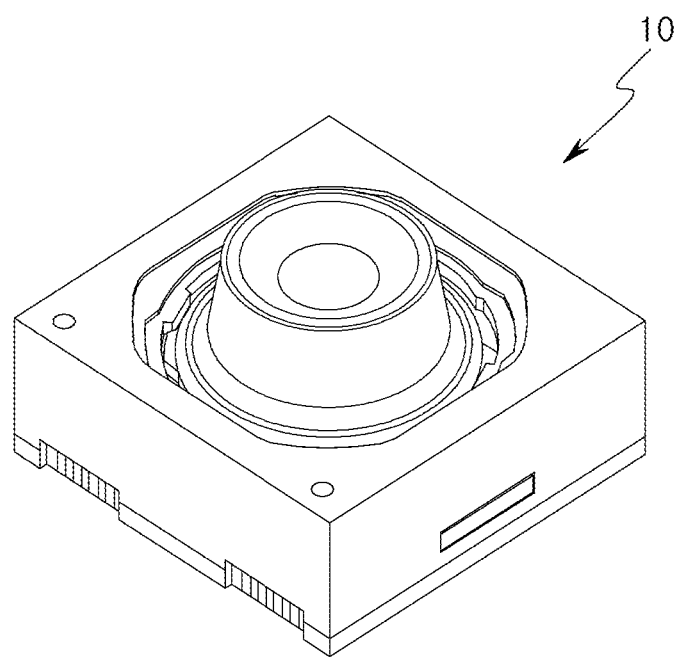
FIG. 10 is a perspective view of an example camera module, in accordance with one or more embodiments.

A camera module, in accordance with one or more embodiments, will be described with reference to FIGS. 10 and 11.

A camera module 10, in accordance with one or more embodiments, may be mounted in a portable electronic product. As non-limiting examples, the camera module 10 may be mounted on a mobile phone, laptop, or the like. However, the usage range of the camera module 10 according to this example is not limited to the aforementioned electronic products. In an example, the camera module 10 may be mounted in an automated teller machine (ATM), a television for interactive broadcasting, and the like.

Figure 11:
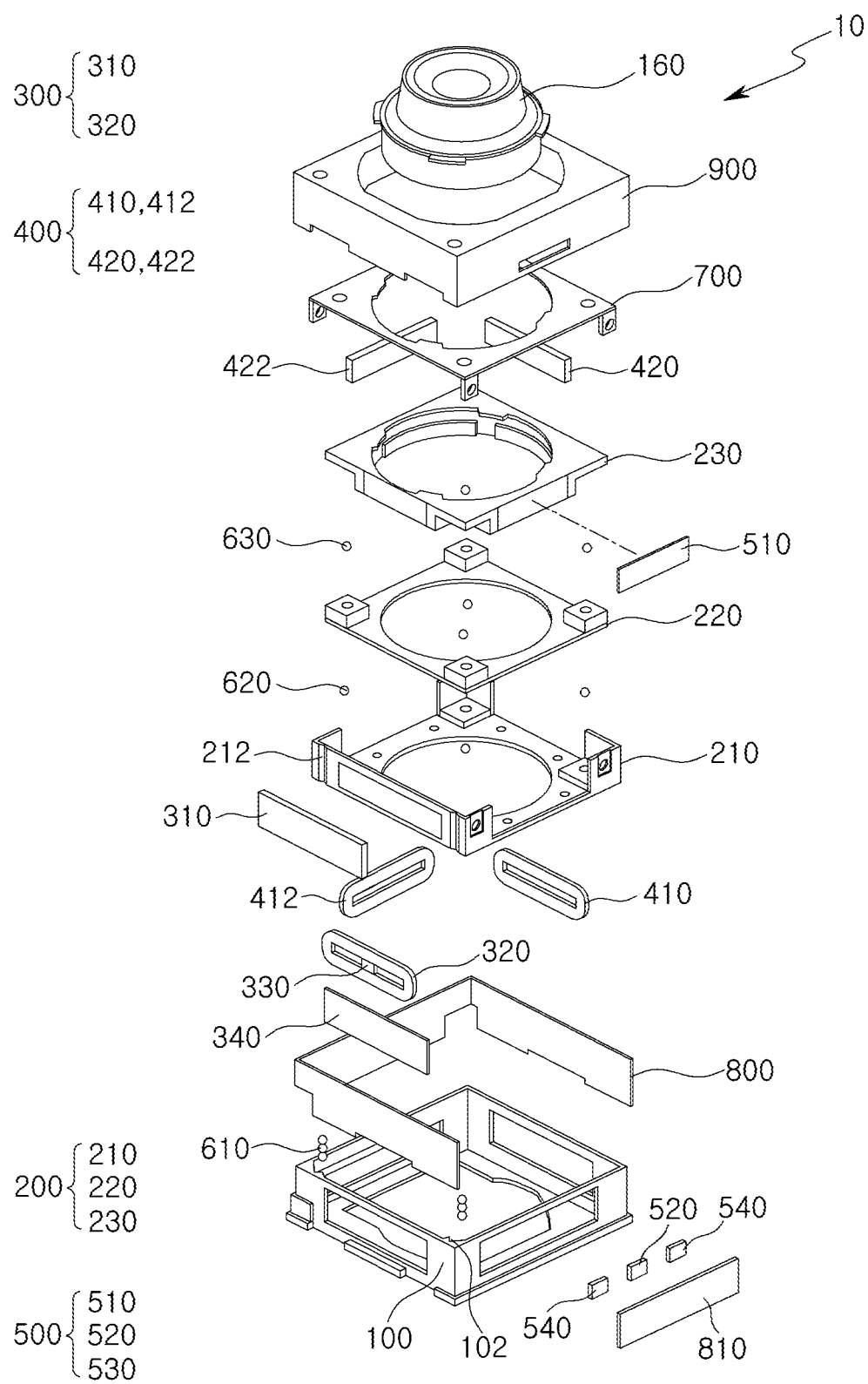
FIG. 11 is an exploded perspective view of the example camera module illustrated in FIG. 10.

Referring to FIG. 11, the camera module 10 includes a housing 100, a lens barrel 160, a movable body 200 (210, 220, 230), a first driving unit 300 (310, 320), a second driving unit 400 (410, 412, 420, 422), and a first sensing unit 500 (510, 520, 530). However, the configuration of the camera module 10 is not limited to the aforementioned members. For example, the camera module 10 may further include one or more ball bearings 600 (610, 620 and 630), a cover member 700, a substrate 800, and a shield can 900.

The housing 100 may be formed in the form of a face body with open upper and lower portions. For example, the housing 100 may be configured in a substantially hexahedral shape. Four sides of the housing 100 may be partially cutaway. The driving force of the first driving unit 300 and the second driving unit 400 may be transmitted to the movable body 200 through the cut side. A pair of first guide grooves 102 may be formed in an inner side of the housing 100. The first guide groove 102 may be formed to be elongated in the height direction of the housing 100. A first ball bearing 610 may be disposed in the first guide groove 102.

The movable body 200 is disposed inside the housing 100 and may be configured to move in an optical axis direction and a direction, perpendicular to the optical axis within the housing 100. The movable body 200 may be comprised of a plurality of members. For example, the movable body 200 may be comprised of a first frame 210, a second frame 220, and a third frame 230.

The first frame 210 may have a shape, of which upper and lower portions in the vertical direction are open, and which has one closed side and three open sides. A pair of second guide grooves 212 may be formed on one closed side. At least one first ball bearing 610 may be disposed in the second guide groove 212. The first frame 210 is disposed inside the housing 100. The first frame 210 may be configured to move in the optical axis direction with respect to the housing 100. For example, the first frame 210 may move in the optical axis direction by the first ball bearing 610 disposed in the guide grooves 102 and 212. The driving force necessary to drive the first frame 210 may be provided by the first driving unit 300.

The second frame 220 may have a substantially thin plate shape of which upper and lower portions in the vertical direction are open. The second frame 220 may be disposed on the first frame 210 and may be configured to move in a first direction, perpendicular to the optical axis. In an example, the second frame 220 may move in the first direction, perpendicular to the optical axis, based on the second ball bearing 620 disposed between the first frame 210 and the second frame 220. The driving force necessary to drive the second frame 220 may be provided by the second driving unit 400.

The third frame 230 may have a shape, of which upper and lower portions in the vertical direction are open and which has a predetermined height. The third frame 230 is disposed on the second frame 220 and may be configured to move in a second direction, perpendicular to the optical axis. In an example, the third frame 230 may move in the second direction, perpendicular to the optical axis, based on a third ball bearing 630 disposed between the second frame 220 and the third frame 230. The driving force necessary to drive the third frame 230 may be provided by the second driving unit 400.

The lens barrel 160 may be combined with the third frame 230. The lens barrel 160 may be moved by the movable body 200 in the optical axis direction and a direction, perpendicular to the optical axis. In an example, the lens barrel 160 may move in the optical axis direction based on a movement of the first frame 210. In another example, the lens barrel 160 may move in a direction, perpendicular to the optical axis, by the second frame 220 and the third frame 230. The movement of the lens barrel 160 in the direction of the optical axis may enable focus adjustment of the camera module 10, and the movement of the lens barrel 160 in a direction, perpendicular to the optical axis, may enable a camera shake correction function of the camera module 10.

The first driving unit 300 may be configured to move the movable body 200 in the optical axis direction. In an example, the first driving unit 300 may provide a driving force necessary to move the first frame 210 in the optical axis direction. The first driving unit 300 may include a first driving magnet 310 and a first driving coil 320. The first driving magnet 310 may be disposed on the first surface of the first frame 210, and the first driving coil 320 may be disposed on the housing 100.

The camera module 10 may include a second sensing unit to detect the moving position of the movable body 200 in the optical axis direction. In an example, the camera module 10 may include a hall sensor 330. In a non-limiting example, the hall sensor 330 may be disposed in the center of winding of the first driving coil 320.

The second driving unit 400 may be configured to move the movable body 200 in a direction, perpendicular to the optical axis. In an example, the second driving unit 400 may provide a driving force necessary for the movement of the second frame 220 and the third frame 230. The second driving unit 400 may include second driving coils 410 and 412 and second driving magnets 420 and 422. The second driving magnets 420 and 422 may be disposed on the second and third surfaces of the third frame 230, respectively, and the second driving coils 410 and 412 may be disposed on the housing 100. In an example, the second surface of the third frame 230 is a surface intersecting the first surface of the first frame 210, and the third surface of the third frame 230 is a surface intersecting the second surface of the third frame 230 while not intersecting the first surface of the first frame 210.

The first sensing unit 500 may be configured to detect a moving position of the movable body 200 in a direction, perpendicular to the optical axis. In an example, the first sensing unit 500 may be configured to detect the moving positions of the second frame 220 and the third frame 230. The first sensing unit 500 may include a first sensing magnet 510, a first detection sensor 520 and a second detection sensor 540. The first sensing magnet 510 may be disposed in a position having a relatively longest distance from the first driving magnet 310 and the second driving magnets 420 and 422. In an example, the first sensing magnet 510 may be disposed in the center of the fourth surface of the third frame 230. The first sensing magnet 510 may form a first polarity and a second polarity in a direction, perpendicular to the optical axis. In an example, the N-pole and the S-pole of the first sensing magnet 510 may be formed in the same direction as the arrangement direction of the second detection sensor 540. A neutral region may be formed between the first polarity (N pole) and the second polarity (S pole) of the first sensing magnet 510.

In a non-limiting example, the first detection sensor 520 may be disposed on the housing 100. In an example, the first detection sensor 520 may be disposed on one surface of the housing 100 facing the first sensing magnet 510. The first detection sensor 520 may be disposed in a position having a longest distance from the first driving magnet 310 and the second driving magnets 420 and 422. In an example, the first detection sensor 520 may be disposed in the center of the fourth surface of the housing 100. The second detection sensor 540 may be disposed at an interval therebetween in a direction, perpendicular to the optical axis, with the first detection sensor 520 therebetween. In an example, the second detection sensor 540 may be disposed to respectively face both ends of the first sensing magnet 510.

The camera module 10 may include a unit that binds the first frame 210 to the third frame 230. In an example, the camera module 10 may include a cover member 700 that binds the second frame 220 and the third frame 230 to the first frame 210. The cover member 700 is coupled to the first frame 210 in a state in which the first frame 210 to the third frame 230 are stacked, thereby preventing the separation of the second frame 220 and the three frame 230 from the first frame 210.

The camera module 10 may include a unit for supplying current to the driving units 300 and 400. For example, the camera module 10 may include a first substrate 800. The first substrate 800 may be configured to supply current required for driving the first driving unit 300 and the second driving unit 400. In an example, the first substrate 800 may supply current to the first driving coil 320 and the second driving coils 410 and 412. The first substrate 800 may be configured to provide a space in which the first driving coil 320 and the second driving coils 410 and 412 may be disposed. In an example, the first substrate 800 may be disposed to surround the first surface, the second surface, and the third surface of the housing 100, to provide a space in which the first driving coil 320 and the second driving coils 410 and 412 may be disposed in the housing 100.

The camera module 10 may include a unit that is electrically connected to the detection sensors 520 and 540. In an example, the camera module 10 may include a second substrate 810. The second substrate 810 may be configured to transmit a detection signal received from the detection sensors 520 and 540 to a control unit. In an example, the second substrate 810 may be electrically connected to a main circuit board of the camera module 10 together with the first substrate 800. The second substrate 810 may be integrally formed with the first substrate 800. In an example, one end of the first substrate 800 and one end of the second substrate 810 may be configured to be connected to each other. Additionally, the first substrate 800 and the second substrate 810 may be manufactured in the form of a flexible printed circuit board to facilitate thinning of the camera module 10.

The camera module 10 may include a unit that shields electromagnetic waves. In an example, the camera module 10 may include a shield can 900. The shield can 900 may be formed in a shape surrounding the housing 100, the movable body 200, and the cover member 700. Accordingly, intrusion or emission of harmful electromagnetic waves generated inside or outside the camera module 10 may be blocked by the shield can 900.

Figure 12:
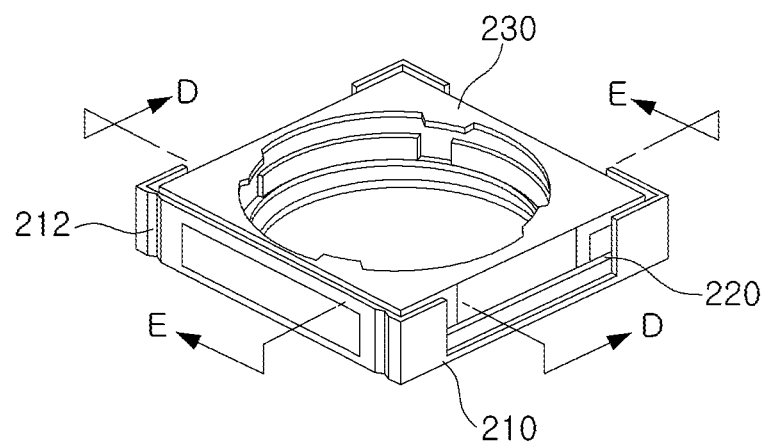
FIG. 12 is a combined perspective view of an example movable body illustrated in FIG. 10.
Figure 13:
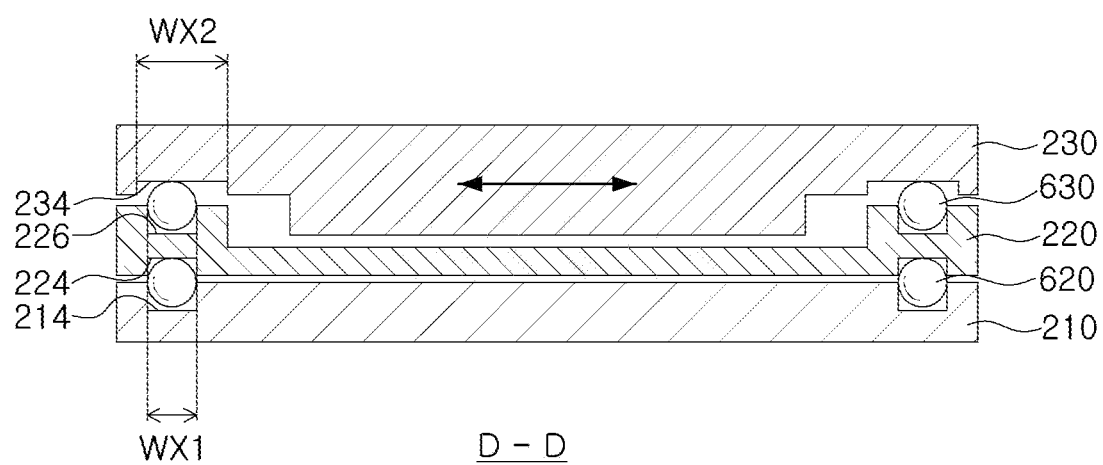
FIG. 13 is a cross-sectional view taken along line D-D in FIG. 3.
Figure 14:
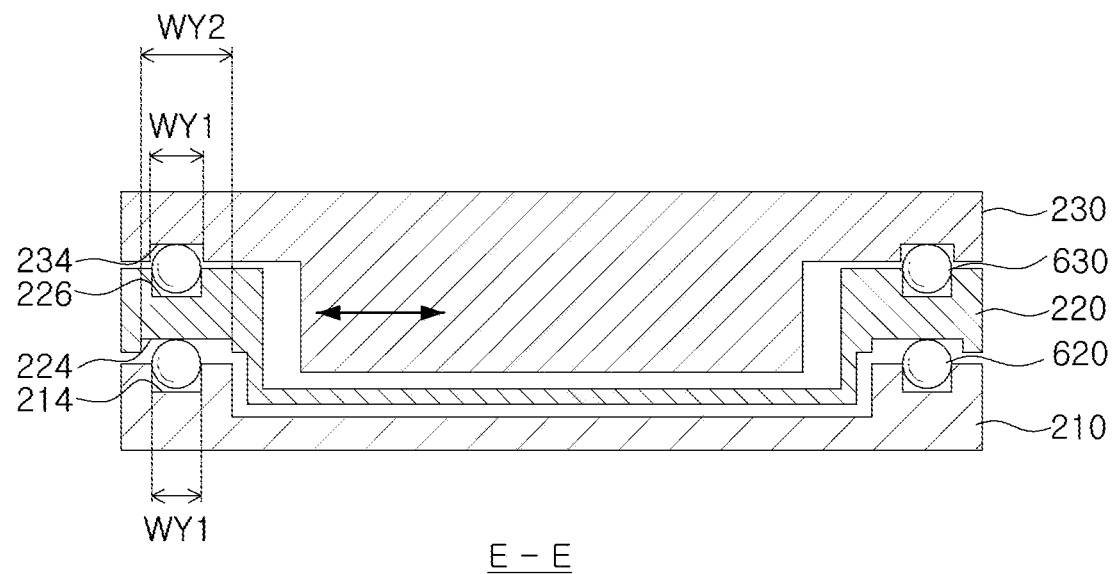
FIG. 14 is a cross-sectional view taken along line E-E in FIG. 3.

The moving structure of the movable body 200 will be described with reference to FIGS. 12 to 14.

The first frame 210, the second frame 220 and the third frame 230 constituting the movable body 200 may be stacked and coupled in the optical axis direction as illustrated in FIG. 3. The first frame 210 may be configured to accommodate the second frame 220 and the third frame 230. For example, the second frame 220 and the third frame 230 may be configured to move in a direction, perpendicular to the optical axis, while being accommodated inside the first frame 210.

Ball bearings 610 and 620 may be disposed between the first to third frames 210 to 230. For example, a second ball bearing 620 may be disposed between the first frame 210 and the second frame 220, and a third ball bearing 630 may be disposed between the second frame 220 and the third frame 230.

A space for the ball bearing to be disposed in may be formed in the first frame 210 to the third frame 230. In an example, the first groove 214 may be formed in an upper portion of the first frame 210, the second grooves 224 and 226 are formed in upper and lower portions of the second frame 220, and the third groove 234 may be formed in a lower portion of the third frame 230.

The lengths of the grooves 224 and 234 formed in the lower portions of the second frame 220 and the third frame 230 may be formed differently depending on the moving directions of the second frame 220 and the third frame 230. In example, a length WY2 of the groove 224 in the first direction may be greater than a length WX1 in the second direction, and a length WX2 of the groove 234 in the second direction may be greater than a length WY1 of the groove 234 in the first direction. Additionally, the length WY2 of the groove 224 in the first direction may be greater than the length WY1 of the grooves 214, 226 and 234 in the first direction, and the length WX2 of the groove 234 in the second direction may be greater than the length WX1 of the grooves 214, 224 and 226 in the second direction.

In the example of the second frame 220 configured as described above, since the length of the groove 224 in the first direction may be greater than the length of the groove 214 of the first frame 210 in the first direction, relative movement thereof with respect to the first frame 210 may be ensured. Additionally, in the example of the third frame 230, since the length of the grooves 234 in the second direction is greater than the length of the groove 226 of the second frame 220 in the second direction, relative movement of the third frame 230 relative to the second frame 220 may be enabled.

The disposition of the first sensing unit will be described with reference to FIG. 15.

Figure 15:
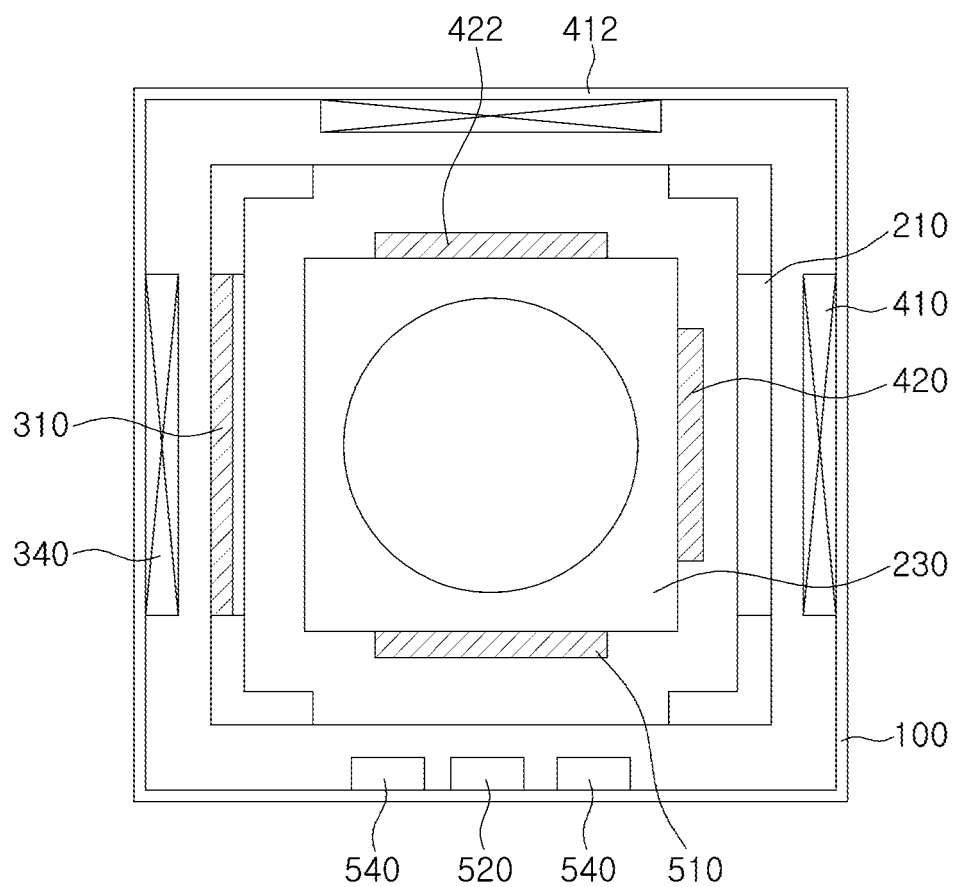
FIG. 15 is a plan view illustrating a coupling state of the example movable body and a housing illustrated in FIG. 12.

Referring to FIG. 15, the first sensing unit 500 may be disposed in a portion of the module that does not overlap with the first driving unit 300 and the second driving unit 400 as illustrated in FIG. 6. In an example, the first driving unit 300 may be disposed on the first surfaces of the housing 100 and the first frame 210, the second driving unit 400 may be disposed on the second surface and the third surface of the housing 100 and the third frame 230, and the first sensing unit 500 may be disposed on the fourth surface of the housing 100 and the third frame 230.

The first sensing unit 500 may include a first sensing magnet 510, a first detection sensor 520 and a second detection sensor 540. The first sensing magnet 510 may be disposed on one surface of the third frame 230 to significantly reduce the influence of the driving magnets 310, 420 and 422, as illustrated in FIG. 6. The first detection sensor 520 and the second detection sensor 540 may be disposed on one surface of the housing 100, to significantly reduce influence of the driving magnets 310, 420 and 422 while detecting the magnetic field of the first sensing magnet 510.

The first sensing unit 500 configured as described above may detect a position of the third frame 230 through the magnetic field of the first sensing magnet 510, in a state in which the first sensing unit 500 is hardly affected by the magnetic fields generated from the driving unit 300 and 400. Therefore, according to this example, not only image stabilization may be quickly performed through the first sensing unit 500, but also reliability of hand shake correction may be improved.

Figure 16A:
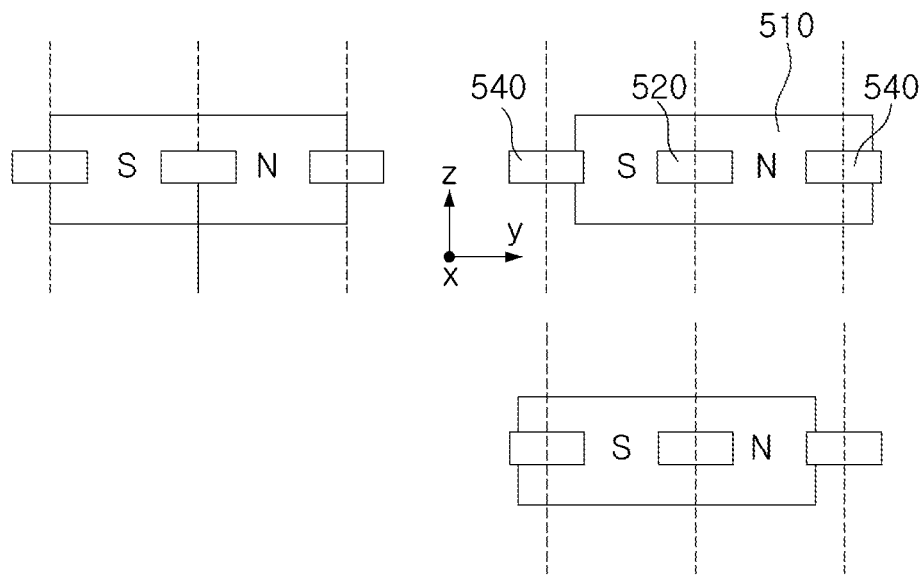
FIGS. 16A and 16B illustrate a side view and a plan view of an arrangement form of an example sensing unit illustrated in FIG. 15.
Figure 16B:
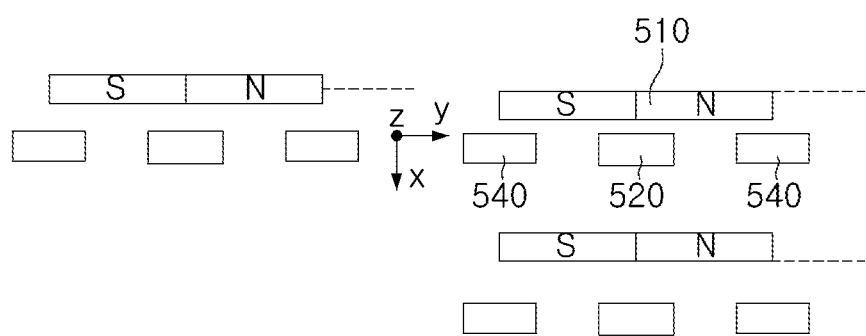

Next, a method of detecting the position of the third frame 230 based on the first sensing unit 500 will be described with reference to FIGS. 16 and 17.

The first sensing unit 500 may detect the position of the third frame 230 moving in the direction, perpendicular to the optical axis, through the first sensing magnet 510, the first detection sensor 520 and the second detection sensor 540. In an example, the first sensing unit 500 may calculate a movement amount y and a movement amount x of the third frame 230 in the first direction (the Y-axis direction based on FIGS. 16A and 16B) and the second direction (the X-axis direction based on FIGS. 16A and 16B), through a deviation h5 and a sum h6 of a value h1 obtained from the first detection sensor 520 and a value obtained from two second detection sensors 540. The calculation formula for calculating the movement amount y and the movement amount x is as follows.

$$y = h5/h1$$

$$x = h1 \text{ or } h6$$

Figure 17A:
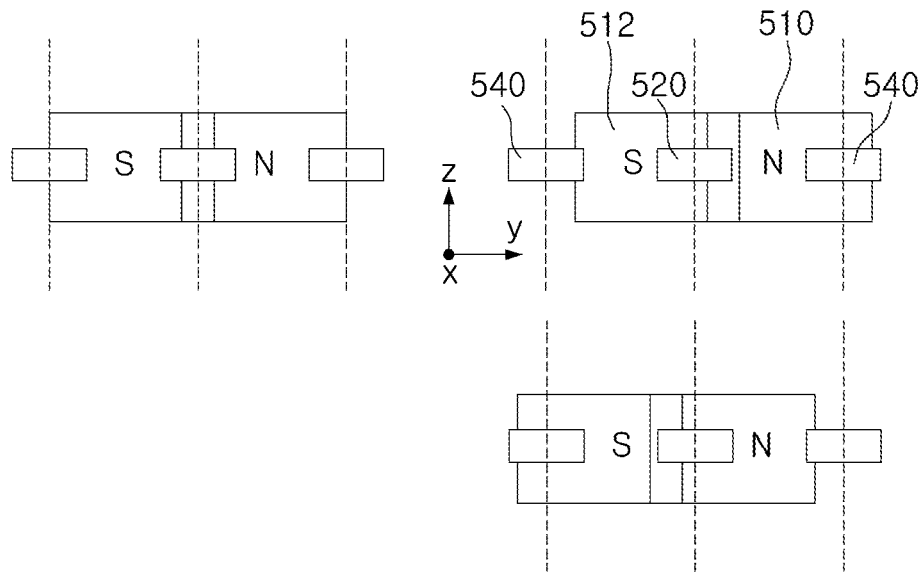
FIGS. 17A and 17B illustrate a side view and a plan view of an arrangement form of an example sensing unit, in accordance with one or more embodiments.
Figure 17B:
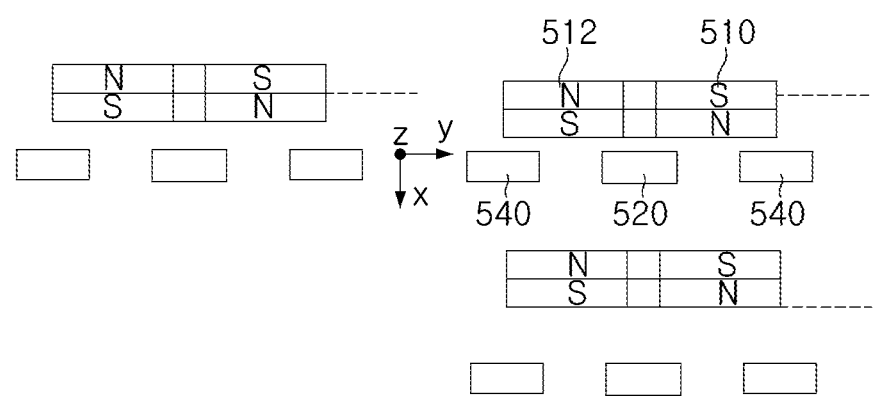

The first sensing unit 500 may include a plurality of first sensing magnets 510 and 512 as illustrated in FIGS. 17A and 17B. For example, the first sensing magnets 510 and 512 may be disposed at an interval therebetween in a direction, perpendicular to the optical axis. In this form, the movement amount of the third frame 230 may be calculated through the following calculation formula.

$$y = h1 \text{ or } h6$$

$$x = h5/h1$$

As set forth above, according to examples, the position correction of the lens module depending on a position change of the lens module may be performed quickly and accurately. Therefore, according to examples, the phenomenon of resolution deterioration due to the position change of the lens module may be reduced.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module device comprising:
 a movable body configured to accommodate a lens barrel and configured to be moved in a direction of an optical axis and in a direction perpendicular to the optical axis;
 a housing configured to accommodate the movable body;

a first driving unit, disposed only on a first surface of the movable body, and configured to generate a first driving force to move the movable body in the direction of the optical axis;

a second driving unit, disposed only on a second surface and a third surface of the movable body, and configured to generate a second driving force to move the movable body in the direction perpendicular to the optical axis; and a first sensing unit, disposed only on a fourth surface of the movable body, and configured to detect a position of the lens barrel when the lens barrel is moved in the direction perpendicular to the optical axis.

2. The device of claim 1, wherein the movable body comprises:
   a first frame, configured to move in the direction of the optical axis;
   a second frame, disposed on the first frame, and configured to move in a first direction, perpendicular to the optical axis; and
   a third frame, disposed on the second frame, and configured to move in a second direction, perpendicular to the optical axis and the first direction.

3. The device of claim 2, further comprising a cover member combined with the first frame when the second frame and the third frame are mounted to prevent the second frame and the third frame from deviating from the first frame.

4. The device of claim 2, further comprising ball bearings disposed between the first frame and the second frame, and between the second frame and the third frame.

5. The device of claim 2, wherein the first driving unit comprises a first driving magnet disposed on a first surface of the first frame, and
   the second driving unit comprises two second driving magnets respectively disposed on different first and second surfaces of the third frame, not corresponding to the first surface of the first frame.

6. The device of claim 5, wherein the first sensing unit comprises a first sensing magnet disposed on a third surface of the third frame, not corresponding to the first surface of the first frame.

7. The device of claim 1, wherein the first sensing unit comprises:
   a first sensing magnet disposed on the movable body; and
   a first detection sensor disposed on the housing.

8. The device of claim 7, wherein the first detection sensor is disposed at an interval in a direction perpendicular to the optical axis.

9. The device of claim 7, wherein the first detection sensor is disposed at an interval in the direction of the optical axis.

10. The device of claim 7, wherein the first sensing magnet is configured to have a first polarity and a second polarity formed in a direction perpendicular to the optical axis.

11. The device of claim 10, wherein the first sensing magnet is configured to have a neutral region disposed between the first polarity and the second polarity.

12. The device of claim 7, wherein the first sensing magnet is provided at an interval in a direction perpendicular to the optical axis.

13. An electronic device comprising:
   a housing; and
   a camera module disposed in the housing,
   wherein the camera module comprises:
      a moveable body, configured to accommodate a lens barrel, the movable body comprising:
      a first frame, disposed in the housing, and configured to move the lens barrel in an optical axis direction;
      a second frame, disposed on the first frame, and configured to move the lens barrel in a first direction, perpendicular to the optical axis direction;
      a third frame, disposed on the second frame, and configured to move the lens barrel in a second direction perpendicular to the optical axis direction,
      a first driving unit, disposed only on a first surface of the moveable body, and configured to move the first frame in the optical axis direction,
      a second driving unit, disposed only on a second surface and a third surface of the moveable body, and configured to move the second frame and the third frame in the first direction and the second direction, and
      a first sensing unit, disposed only on a fourth surface of the movable body, and configured to detect a moving position of the movable body in the first direction and the second direction.

14. The device of claim 13, wherein the first sensing unit is configured to detect a position of the lens barrel when the lens barrel is moved in the first direction and/or the second direction.

15. The device of claim 13, further comprising a second sensing unit configured to detect a moving position of the movable body in the optical axis direction.

* * * * *